United States Patent Office 3,398,117
Patented Aug. 20, 1968

3,398,117
PROCESS FOR THE PREPARATION OF ORGANOPOLYSILOXANES
Jean-Henri Baronnier and Georges Leon Pagni, Lyon, France, assignors to Rhone-Poulenc S.A., Paris, France, a French body corporate
No Drawing. Filed Feb. 8, 1967, Ser. No. 614,558
Claims priority, application France, Feb. 11, 1966, 49,335
8 Claims. (Cl. 260—46.5)

ABSTRACT OF THE DISCLOSURE

The invention provides a process for the preparation of organopolysiloxanes by rearrangement and polymerisation of cyclic or linear organopolysiloxanes using as catalyst a combination of an alkali and a triaminophosphine oxide such as tris(dimethylamino)phosphine oxide.

---

This invention relates to the preparation of organopolysiloxanes by rearrangement and polymerisation of branched or unbranched cyclic or linear organopolysiloxanes.

It is known that it is possible to convert organopolysiloxanes of low molecular weight, such as octaorganocyclotetrasiloxanes or hexaorganocyclotrisiloxanes, into polymers of higher molecular weight by polymerisation in the presence of basic catalysts such as alkali-metal hydroxides, alkali-metal silanolates, alkali-metal alcoholates and quaternary ammonium hydroxides. The length of the chains obtained is a function of the duration and the mode of polymerisation, and it is possible in this manner to prepare either a gummy polymer or a more or less viscous oil. To obtain an oil in which the molecules are terminated by hydroxyl groups, for example, a quantity of water is added during the polymerisation to determine the molecular weight of this oil. If, instead of water, $\alpha,\omega$-bis(-triorganosilyl)diorganopolysiloxanes or alkoxysiloxanes or short-chained alkoxysiloxanes are added, oils terminated by a triorganosilyl grouping or an alkoxy radical are formed by rearrangement and balancing.

These processes of polymerisation and rearrangement are currently employed in the organosilicon compound industry for producing oils and gums of various natures, and also certain resins. Although these processes yield good results, it is desirable to improve them either by reducing the temperature and duration of the polymerising reactions or by making possible the performance of rearrangements which are not possible by the previously known processes.

In French Patent No. 1,078,412, the use, as solvents, of saturated aliphatic and mononuclear aryl nitriles, or of amides of the formula RCON(R')$_2$ in which R represents hydrogen or methyl and R' is an alkyl radical, is described. The use of such solvents makes it possible to polymerise organopolysiloxanes, especially cyclic organopolysiloxanes, fairly rapidly and to operate at lower temperatures than in earlier processes. However, the quantities of solvent necessary for achieving this result are relatively great.

The processes described in French Patent Nos. 1,354,443 and 1,359,414 are more effective. In these processes it is proposed to rearrange organopolysiloxanes in the presence of an alkaline catalyst and an alkylsulphoxide or alkylsulphone. However, these latter compounds are not stable: alkylsulphoxides degrade readily on heating and react with certain solvents and chemical compounds. Moreover, alkylsulphoxides have a repulsive odour, which is a considerable disadvantage because it is very difficult to remove this odour from the products obtained.

The present invention provides a process for the preparation of an organopolysiloxane by the rearrangement and polymerisation of a less highly polymerised or cyclic organopolysiloxane, which comprises subjecting the said less highly polymerised or cyclic organopolysiloxane to the action of an alkaline catalyst and an aminophosphine oxide of the formula:

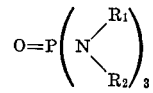

I where R$_1$ and R$_2$ are the same or different and are each monovalent organic radicals or are joined to form with the adjacent nitrogen a heterocyclic radical.

Although a wide variety of compounds of Formula I may be employed tris(dialkylamino)phosphine oxides in which each alkyl group contains 1 to 4 carbon atoms, and especially tris(dimethylamino)phosphine oxide, are preferably used.

The alkaline catalyst used may be any of the usual alkaline catalysts such as, for example, the alkali metal hydroxides, such as sodium, potassium or caesium hydroxide; the alkali metal alcoholates such as sodium ethoxide; the alkali metal silanolates, such as potassium trimethylsilanolate or sodium triphenylsilanolate; the amines; the quaternary ammonium compounds of the formula: (R'')$_4$NOR''' in which the radicals R'' are identical or different, and are substituted or unsubstituted aliphatic, alicyclic, aryl or aralkyl hydrocarbon radicals and R''' is hydrogen or the radical R'', more particularly benzyltrimethylammonium hydroxide, tetramethylammonium hydroxide or tetramethylmethoxyammonium; the phosphines; the phosphonium compounds of the formula: (R'')$_4$POR''' in which R'' and R''' are as previously defined, more particularly tetramethylphosphonium hydroxide, tetrabutylphosphonium hydroxide, tributylcyclohexylphosphonium hydroxide or tetrabutylbutoxyphosphonium. Generally speaking, it is most convenient to use, as the alkaline catalyst, an alkali metal hydroxide, preferably potassium hydroxide, an alkaline metal alkoxide of 1 to 4 carbon atoms, or a tetraalkylammonium hydroxide in which each alkyl is of 1 to 4 carbon atoms. The amount of alkaline catalyst used is that previously proposed for such catalysts, e.g. 0.001–1% based on the weight of the organopolysiloxane starting material.

The polymerisation and rearrangement process of the invention is applicable to all organosilicon compounds which are polymerisable and rearrangeable in an alkaline medium. It is applicable more particularly to branched or unbranched linear organopolysiloxanes and to cyclic organopolysiloxanes, all of which are characterised by the presence of groupings of the formula:

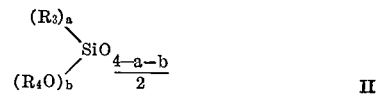

II in which R$_3$ represents an unsubstituted hydrocarbon radical or a hydrocarbon radical substituted by atoms or radicals such as halogen atoms and amino and cyano groups, and R$_4$ represents a hydrogen atom or the radical R$_3$, and $a$ and $b$ each have any integral or non-integral value from 0 to 3, the sum $a+b$ being lower than or equal to 3. Of these organopolysiloxanes formed of groupings of Formula II there may be mentioned the cyclic diorganopolysiloxanes, the linear diorganopolysiloxanes the chains of which are terminated at each end by a hydroxyl group or a triorganosilyl group or both a hydroxyl grouping and a triorganosilyl grouping, and conventional branched or linear organopolysiloxanes comprising hydroxyl or alkoxy groupings attached at random or in predetermined manner to the silicon atoms present.

These organopolysiloxanes may be rearranged and polymerised in the presence of silanes of the formula:

$$(R_3)_c Si(OR_4)_{4-c} \qquad III$$

in which the symbols $R_3$ and $R_4$ are as hereinbefore defined and $c$ is 0, 1, 2 or 3.

In general, it may be said that the most readily accessible starting material are those of the formula:

$$R_4O\text{-}[Si(R_3)_2O]_n R_4$$

and

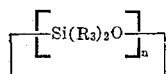

where $R_3$ is alkyl of 1 to 4 carbon atoms, e.g. methyl alkenyl of 2 to 4 carbon atoms, e.g. vinyl, β-cyanoethyl, or phenyl, $R_4$ is hydrogen, alkyl of 1 to 4 carbon atoms, alkenyl of 2 to 4 carbon atoms, β-cyanoethyl or phenyl, and $n$ is an integer. Such materials may be used alone or in admixture with a silane of the Formula III.

Specific examples of compounds containing groupings of the Formula II, are: hexamethylcyclotrisiloxane, octamethylcyclotetrasiloxane, tetramethyltetravinylcyclotetrasiloxane, hexaphenylcyclotrisiloxane, octaphenylcyclotetrasiloxane, pentamethylpentaethylcyclopentasiloxane, hexamethyldisiloxane, octamethyltrisiloxane and the higher homologues, the divinyltetramethyldisiloxanes, the tetravinyldimethyldisiloxanes, the α,ω-dihydroxylated dimethylpolysiloxanes and the α,ω-dialkoxylated dimethylpolysiloxanes having from 2 to 100 silicon atoms, and tetraphenyldisiloxanediol.

Examples of silanes of Formula III are methyltriethoxysilane, vinyltri(methoxyethoxy)silane, phenyltriethoxysilane, vinylmethyldiethoxysilane, diphenyldimethoxysilane, and tetraethoxysilane.

The organopolysiloxanes of Formula II may be rearranged and polymerised alone or in combination with one another or with the silanes of Formula III.

The alkaline catalysts may be used as solutions or suspensions in cyclic or linear organopolysiloxanes. Therefore, either the alkaline catalyst may first be added to the organopolysiloxane to be polymerised and then the aminophosphine oxide, or the alkaline catalyst may be added in admixture with the aminophosphine oxide of Formula I.

The quantity of aminophosphine oxide used may vary within fairly wide limits, and very small proportions are effective. Thus the aminophosphine oxides of Formula I can be used in proportions as low as 0.0005% by weight based on the weight of organopolysiloxane to be polymerised. Theoretically, there is no upper limit on the proportion of aminophosphine oxide which can be employed, but in practice it is rarely desirable to use more than 2% by weight based on the organopolysiloxane to be polymerised. When larger quantities are employed, the polymerisation takes place substantially entirely in solution in the aminophosphine oxide and this is not always an advantage, especially when large volumes of organosilicon compounds are treated.

The polymerisation and the rearrangement of the organopolysiloxane starting materials, whether alone or mixed with silanes such as, for example, those of Formula III, under the conditions of the present invention, take place rapidly and at relatively low temperatures. For example, if it is desired to convert organocyclopolysiloxanes into gummy substances, the polymerisation may be carried out in a temperature range between ambient temperature and the temperature at which the conventional alkaline catalysts become effective. In general, a temperature from 50° to 200° C. will be found to be satisfactory. This extended temperature range makes it possible to choose operating conditions which are best adapted to the technical requirements of the particular reaction involved.

The time of the reaction may vary from a fraction of a minute to several hours. The progress of the reaction is easily followed by monitoring the viscosity of the reaction medium. When the viscosity, and therefore the molecular weight, have increased to the desired extent, the reaction is stopped.

The new process may be carried out at, below or above atmospheric pressure but it is rarely desirable to use pressures other than atmospheric.

The great flexibility of the new process makes possible not only discontinuous polymerisation by the usual methods, but also continuous polymerisation.

The new process involves the use of only very small quantities of aminophosphine oxides, which constitutes an advance over the earlier processes based upon the use of nitriles or amides. Another advantage of aminophosphine oxides is their stability under heat, which makes it possible, with an aminophosphine oxide such as tris(dimethylamino)phosphine oxide, to remove the aminophosphine oxide simply by heating the reaction medium once the rearrangement is complete or has reached the desired degree. The aminophosphine oxide is not degraded and does not impair the mechanical properties or stability to heat of the polymerised organosilicon products. Thus, the organosilicon gums prepared by the process of this invention and comprising, for example, methyl, ethyl, vinyl and phenyl groupings attached to silicon, give elastomers or excellent quality when mixed with usual fillers and then cross-linked with the aid of a peroxide.

Apart from fluids and gums, it is also possible to prepare by the new process organosilicon compounds of predetermined structure. Thus, resins in solution in aromatic hydrocarbons may be rearranged with cyclic or linear organopolysiloxanes to obtain new compounds of ordered structure, comprising a succession of branched units and linear units, which structure it is difficult to build up under such simple conditions by any other method. As an example of such resins, there may be mentioned the product obtained by hydrolysis of phenyltrichlorosilane in an aromatic hydrocarbon medium.

The following examples illustrate the invention.

Example 1

Organopolysiloxane oils having a viscosity of about 500,000 centistokes (cst.) at 25° C. are prepared by the following procedure. Into a 2-litre round-bottomed flask provided with a stirrer and continuously kept in a dry nitrogen atmosphere are introduced 1000 g. of octamethylcyclotetrasiloxane and variable quantities of different basic catalysts and tris(dimethylamino)phosphine oxide (hereinafter referred to as HMPT). The mixture is heated to different temperatures with stirring until an oil having a viscosity of 500,000 cst. at 25° C. is obtained.

The results obtained in the various experiments carried out are given in the following table, in which the percentages of catalyst and HMPT are given by weight in relation to the octamethylcyclotetrasiloxane introduced.

| Nature of the catalyst | Alkaline catalyst, percent | HMPT, percent | Polymerisation temperature, ° C. | Duration of the polymerisation |
|---|---|---|---|---|
| Tetramethylammonium hydroxide $(CH_3)_4$—$NOH.5H_2O$. | 0.04 | 0 | 100 | 25 min. |
| Tetramethylammonium hydroxide. | 0.04 | 0.1 | 100 | 5 min. |
| Sodium ethoxide | 0.02 | 0 | 150 | More than 24 h. |
| Do. | 0.02 | 0.1 | 150 | 40 min. |
| Potassium hydroxide. | 0.002 | 0 | 100 | More than 24 h. |
| Do. | 0.002 | 0.1 | 100 | 11 min. |
| Do. | 0.02 | 0 | 100 | More than 24 h. |
| Do. | 0.01 | 0.1 | 100 | 30 seconds. |

These results show that the association of HMPT with alkaline catalysts in a proportion as small as 0.1% based on the weight of octamethylcyclotetrasiloxane very distinctly increases the rate of polymerisation.

Example 2

A dimethylpolysiloxane oil blocked by trimethylsilyl end groupings is prepared by the following procedure. Into a 2-litre round-bottomed flask provided with a stirrer and placed in a nitrogen atmosphere, are introduced 1000 g. of a hydrolysis product of dimethyldichlorosilane having a viscosity of 8 cst. at 25° C. and a hydroxyl group content of 0.4% by weight, 17 g. of hexamethyldisiloxane, 1.13 g. of a 45% aqueous potassium hydroxide solution, and 5 g. of HMPT. The mixture is heated to 140° C. for 4 hours, 25 minutes, and is then neutralised with 10.5 g. of sodium bicarbonate. After removal of volatile materials by heating to 250° C. under reduced pressure (5 mm. Hg), 916 g. of oil having a viscosity of 232 cst. at 20° C. are obtained.

When operating under the same conditions, but without the HMPT, it is necessary to heat for more than 24 hours to obtain the same result.

Example 3

Into a 6-litre reaction vessel placed in a nitrogen atmosphere, are introduced octamethylcyclotetrasiloxane (3,600 g.), 1,3,5,7-tetramethyl-1,3,5,7-tetravinylcyclotetrasiloxane (8.28 g.), and tetradecamethylhexasiloxane (2.7 g.). The mixture is heated to 100° C., and a catalytic system consisting of a 1% potassium hydroxide suspension in octamethylcyclotetrasiloxane (4.6 g.) and HMPT (2.95 g.) is added. After heating for 2 hours at 100° C. a gum having a viscosity at 25° C. of 19 million centipoises (cpse.) is obtained. Moist nitrogen is then introduced into the mixture until a gum having a viscosity of 11.2 million cpse. at 25° C. is obtained. The product is then neutralised by the addition of 70 mg. of phosphoric acid and volatile constituents are removed by heating at 190° C. under reduced pressure (65 mm. Hg). 3235 g. of a gum having a viscosity of 19.1 million cpse. at 25° C. are thus obtained.

This gum may be employed to prepare elastic solids as in the following experiment.

A mixture is prepared by the usual methods comprising, for each 100 parts of gum, 50 parts of silica of combustion whose surface has received an organosilicon compound coating by heating in octamethylcyclotetrasiloxane, 1.8 g. of tetramethylethylenedioxydimethylsilane as plasticising agent, and 1.9 parts of a 50% dispersion of dichlorobenzoyl peroxide in a silicone oil. The mixture is then moulded in the form of plates 2 mm. thick and heated at 125° C. under 50 bars pressure for 10 minutes. Some of the plates obtained are heated at 250° C. for a further 16 hours in a ventilated oven. Mechanical tests carried out on these plates gave the following results:

| Mechanical properties | Shore A hardness | Breaking strength in kg./cm.² | Elongation at break in percent | Tearing strength in kg./cm. |
|---|---|---|---|---|
| After 10 minutes at 125° C | 52 | 99 | 510 | 22.5 |
| After 16 hours at 250° C | 62 | 75 | 275 | 17 |

Example 4

Into a 2-litre reaction vessel provided with a stirrer, a nitrogen admission duct and a condenser, are introduced a crude hydrolysis product of dimethyldichlorosilane (identical with that of Example 2) (1250 g.), methyltriethoxysilane (310 g.), potassium hydroxide (0.6 g.) and HMPT (1.6 g.). This mixture is heated at 100° C. with stirring and samples are periodically taken to measure the viscosity of the liquid. The results are set out in the following table:

Duration of heating at 100° C.: Viscosity at 20° C. (cst.)
0 _____ 5.7
0 h. 40 min. _____ 8.3
1 h. 10 min. _____ 10.9

The product, which has a viscosity of 10.9 cst., may be represented by the following average formula:

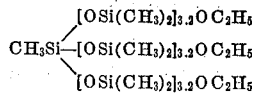

To obtain a similar product in the absence of HMPT, it is necessary to heat for at least 3 hours at 150° C.

Example 5

A toluene solution of 175 g. of phenyltrichlorosilane and 400 g. of toluene is poured into 400 g. of water and the temperature of the reaction mixture is maintained at about 20° C. with the aid of an external cooling system. When the addition is complete, the aqueous layer is removed and the toluene layer is heated to drive off the water and hydrochloric acid by azeotropic distillation. A quantity of potassium hydroxide is then added such that, after refluxing the solution and removing azeotropically the water derived from the condensation of the SiOH groups with one another, 15 mg. of potassium hydroxide remain. To the toluene solution containing 15 mg. of potassium hydroxide, octamethylcyclotetrasiloxane (60 g.), 1,3,5,7-tetramethyl-1,3,5,7-tetravinylcyclotetrasiloxane (1.7 g.), and HMPT (8.6 g.) are added. The mixture is heated under reflux at 115° C. for 3 hours and then neutralised with 25 mg. of phosphoric acid. The solvent and the other volatile compounds are removed by passing the mixture through a rotary evaporator at a temperature of 75° C. and under reduced pressure (5 mm. Hg). A solid residue weighing 149 g. is thus obtained in the form of a white powder melting at 131° C. This product may be employed in various applications. For example 35.5 g. of this powder may be mixed with 40 g. of calcium carbonate, 24 g. of glass fibres 2 mm. in length, and 0.5 g. of dicumyl peroxide by the usual methods, and the mixture obtained then moulded under 35 bars pressure and heated at this pressure for 5 minutes at 175° C. The moulded product obtained possesses excellent electrical properties.

Example 6

By the procedure of Example 5, a toluene solution of a precondensate is prepared, and octamethylcyclotetrasiloxane (190 g.), 1,3,5,7-tetramethyl-1,3,5,7-tetravinylcyclotetrasiloxane (3 g.) and HMPT (15 g.) are then added. This mixture is polymerised by heating under reflux for 3 hours and neutralised, and volatile constituents are removed. 268 g. of liquid resin having a viscosity of 465 cst. at 20° C. are thus obtained. This resin is particularly suitable as an impregnating resin for the preparation of laminates, in association either with peroxides or with organosilicon compounds containing SiH groups for crosslinking.

Example 7

Into a 250 cc. reaction vessel, 120 g. of octaphenylcyclotetrasiloxane and 30 g. of tetradecamethylhexasiloxane are introduced. The mixture is heated to about 170° C., and 0.55 g. of a catalytic solution prepared from 1.36 g. of potassium hydroxide, 8.64 g. of tetradecamethylhexasiloxane and 90 g. of HMPT is introduced. The stirring is maintained for 1 hour at 170° C., and the temperature is then allowed to fall to 100° C. 0.015 g. of acetic acid is added, stirring is continued for 1 hour still at 100° C., and the volatile products are then removed by distillation in vacuo until a temperature of 170° C. at an absolute pressure of 0.5 mm. Hg is reached. 4 g. of volatile products are removed. The residual oil obtained is left for two days at ambient temperature, and the octaphenylcyclotetrasiloxane crystals which form are removed by filtration. 129.5 g. of an oil having a viscosity of 30,140 cpse. at 25° C. are thus obtained.

By proceeding under the same conditions, but employing 0.055 g. of a catalytic solution prepared from 1.36 g. of potassium hydroxide and 8.64 g. of tetradecamethylhexasiloxane (i.e. without HMPT), 13 g. of volatile products, 59 g. of octaphenylcyclotetrasiloxane, and only 78 g. of the desired oil are obtained.

Example 8

3200 g. of octaphenylcyclotetrasiloxane, and 800 g. of a linear diorganopolysiloxane having an average formula:

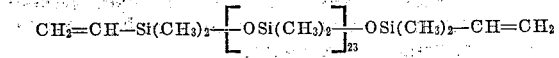

are introduced into a 6-litre reaction vessel. The mixture is heated to 170° C. and 5.9 g. of the catalytic solution containing HMPT employed in Example 8 are added. The temperature is maintained at 170° C. for 5 hours. The mixture is then allowed to cool to 100° C., 0.2 g. of acetic acid is added, and the temperature of 100° C. is maintained for 1 hour. 170 g. of volatile products are then eliminated by heating under reduced pressure until the temperature in the mass reaches 170° C. under a pressure of 7 mm. Hg. 3,830 g. of a clear product are thus obtained having a viscosity of 408,000 cpse. at 25° C. and a vinyl group content of 0.5% by weight; this product does not crystallise at ambient temperature.

Example 9

80 g. of octaphenylcyclotetrasiloxane, 20 g. of a hydrolysis products of methylethyldichlorosilane, having a viscosity of 24.3 cst. at 20° C. and a hydroxyl group content of 0.84% by weight, 125 mg. of HMPT, and 20 mg. of a 10% potassium hydroxide suspension in octamethylcyclotetrasiloxane are introduced into a 250 cc. reaction vessel. The whole is heated at 180° C. for 3 hours and then allowed to cool to 150° C. At this temperature 3 mg. of 85% phosphoric acid are added. The mixture is maintained at 150° C. for one hour and 4 g. of volatile products are then eliminated by heating under reduced pressure until a temperature of 180° C. is reached at a pressure of 3 mm. Hg.

The polymer is allowed to stand for 48 hours, 10 g. of octaphenylcyclotetrasiloxane are separated by filtration and 86 g. of an oil are obtained having a viscosity of 120,000 cpse. at 25° C. and containing 0.04% by weight of hydroxyl groups.

Example 10

52 g. of octamethylcyclotetrasiloxane, 40 g. of the hydrolysis product of β-cyanoethyl(methyl)dichlorosilane having a viscosity of 596 cst. at 20° C., 310 mg. of HMPT, and 50 mg. of a 10% potassium hydroxide suspension in octamethylcyclotetrasiloxane are introduced into a 250 cc. reaction vessel. The mixture is heated at 100° C. for 2 hours, 7.5 mg. of acetic acid are added, the temperature of 100° C. is maintained for a further hour, and 10 g. of volatile products are then eliminated by heating under reduced pressure until a temperature of 170° C. is reached in the mass under a reduced pressure of 2 mm. Hg. 82 g. of an oil are thus obtained having a viscosity of 5,400 cst. at 20° C. and containing 0.15% by weight of hydroxyl groups.

Example 11

68.4 g. of trimethylchlorosilane, 232.2 g. of dimethyldichlorosilane, 797 g. of diphenyldichlorosilane, 190.4 g. of phenyltrichlorosilane, 355.3 g. of methylvinyldichlorosilane, and 2,250 cc. of diethyl ether are introduced into a 6-litre round-bottomed flask. 2250 g. of water are then added with stirring in 95 minutes. At the end of the addition, the mixture is stirred for a further 55 minutes and then separated. The aqueous acid liquors are removed, and the ethereal layer is washed and then introduced into a 3-litre round-bottom flask containing 500 cc. of toluene. The solvents (i.e. the ether and the toluene) are then removed by heating until a temperature of 170° C. is reached in the mass under an absolute pressure of 30 mm. Hg. 492 g. of toluene and 8 g. of a catalytic solution prepared by mixing 1.43 g. of KOH, 8.57 g. of tetradecamethylhexasiloxane and 90 g. of HMPT are then added.

The mixture is heated under reflux and the water derived from the condensation of the SiOH groups is eliminated azeotropically. 14 cc. of water are thus extracted in a period of 1 hour and 30 minutes. The mass is allowed to cool to 100° C., 0.5 cc. of acetic acid is added, the mixture is stirred at 100° C. for 1 hour, and the toluene is then removed by distillation under reduced pressure until a temperature of 200° C. is reached under a pressure of 1.3 mm. Hg. 1,105 g. of clear liquid remain, having a viscosity at 20° C. of 5.730 cst., and containing 5.4% by weight of vinyl groupings and 0.006% by weight of the OH groups.

We claim:

1. Process for the preparation of an organopolysiloxane by the rearrangement and polymerization of a less highly polymerized or cyclic organopolysiloxane, which comprises subjecting the said less highly polymerized or cyclic organopolysiloxane of the formula:

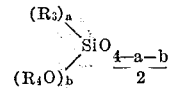

in which $R_3$ represents an unsubstituted hydrocarbon radical or a hydrocarbon radical substituted by atoms or radicals selected from the group consisting of halogen atoms and amino and cyano groups, and $R_4$ represents a hydrogen atom or the radical $R_3$ and $a$ and $b$ each have any integral or non-integral value from 0 to 3, the sum $a+b$ being lower than or equal to 3, to the action of (a) a catalyst selected from the group consisting of an alkali metal hydroxide, an alkali metal alcoholate, an alkali metal silanolate, an amine, a quaternary ammonium hydroxide, a quaternary ammonium hydrocarbon oxide, a quaternary phosphonium hydroxide, a quaternary phosphonium hydrocarbon oxide and a phosphine and (b) an aminophosphine oxide of the formula:

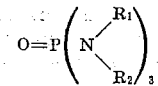

where $R_1$ and $R_2$ are the same or different and are each alkyl of 1 to 4 carbon atoms.

2. Process according to claim 1 in which $R_1$ and $R_2$ are both methyl.

3. Process according to claim 1 in which the amount of aminophosphine oxide used is 0.0005–2.0%, based on the weight of the organopolysiloxane.

4. Process according to claim 1 in which the alkaline catalyst is an alkali metal hydroxide, an alkali metal alkoxide of 1 to 4 carbon atoms, or a tetraalkylammonium hydroxide in which each alkyl is of 1 to 4 carbon atoms.

5. Process according to claim 4 in which the alkaline catalyst is potassium hydroxide.

6. Process according to claim 1 in which the amount of alkaline catalyst used is 0.001–1% based on the weight of the organopolysiloxane.

7. Process according to claim 1 in which the less highly polymerised or cyclic organopolysiloxane is of the formula:

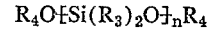

or

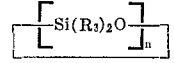

respectively, where $R_3$ is alkyl of 1 to 4 carbon atoms, alkenyl of 2 to 4 carbon atoms, β-cyanoethyl, or phenyl, $R_4$ is hydrogen, alkyl of 1 to 4 carbon atoms, alkenyl of 2 to 4 carbon atoms, β-cyanoethyl, or phenyl, and $n$ is an integer, alone or in admixture with a silane of formula:

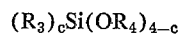

where $c$ is 0, 1, 2 or 3 and $R_3$ and $R_4$ are as hereinbefore defined.

8. Process according to claim 1 in which the reaction is effected at 50° to 200° C.

References Cited
UNITED STATES PATENTS

| | | | |
|---|---|---|---|
| 2,739,952 | 3/1956 | Linville | 260—448.2 |
| 2,830,967 | 4/1958 | Nitzsche et al. | 260—448.2 |
| 3,186,967 | 6/1965 | Nitzsche et al. | 260—46.5 |
| 3,274,153 | 9/1966 | Hyde et al. | 260—448.2 |
| 3,294,740 | 12/1966 | McVannel | 260—448.2 |

DONALD E. CZAJA, *Primary Examiner.*

M. I. MARQUIS, *Assistant Examiner.*